United States Patent [19]

Hagiz

[11] 4,373,589
[45] Feb. 15, 1983

[54] HARVESTING APPARATUS FOR ONIONS

[75] Inventor: Yitzchak Hagiz, Givat Shmuel, Israel

[73] Assignee: Sharnoa Ltd., Petach Tikva, Israel

[21] Appl. No.: 231,114

[22] Filed: Feb. 3, 1981

[51] Int. Cl.³ .................... A01D 37/00; A23N 15/04
[52] U.S. Cl. ...................................... 171/31; 99/636; 99/639
[58] Field of Search .......................... 99/546, 635–637, 99/639–643; 56/327 R, 16.6; 171/10, 14, 20, 21, 25, 26, 31, 36; 209/675–678

[56] References Cited

U.S. PATENT DOCUMENTS

| | | | |
|---|---|---|---|
| 1,098,398 | 6/1914 | Phinney | 99/636 |
| 1,671,263 | 5/1928 | Zuckerman | 99/639 |
| 2,370,717 | 6/1945 | Christman, Jr. | 209/675 X |
| 3,596,994 | 8/1971 | Garden | 171/14 X |
| 3,597,909 | 10/1971 | Lauridsen et al. | 171/36 X |
| 3,646,978 | 3/1972 | Tait | 99/639 |
| 3,669,164 | 6/1972 | Cox | 99/639 X |

*Primary Examiner*—Philip R. Coe
*Assistant Examiner*—Timothy F. Simone
*Attorney, Agent, or Firm*—Browdy & Neimark

[57] ABSTRACT

Onion harvesting apparatus comprising a wheeled chassis arranged to be coupled to driving apparatus, a produce receiving hopper, conveyor apparatus for raising produce from the hopper, precleaning apparatus, trimming apparatus and apparatus for operating the conveyor apparatus during movement of the wheeled chassis.

7 Claims, 4 Drawing Figures

HARVESTING APPARATUS FOR ONIONS

FIELD OF THE INVENTION

The present invention relates to harvesting apparatus generally and more particularly to harvesting apparatus for onions.

BACKGROUND OF THE INVENTION

Various types of harvesting devices for onions are known. Conventionally onions are removed from the ground and spread on the ground surface for drying by apparatus which is outside the scope of the present invention. Once the onions are field dried they are gathered manually or by mechanized means and taken to a packing house where they are cleaned, sorted, trimmed and bagged. This procedure, and the transport involved requires a relatively large amount of time and expensive manpower as well the construction of a fixed structure for use as a packing house.

Applicants have introduced a stationary onion combine which can be towed to the field at which harvesting takes place and operated in a fixed location in the field by the power take off of a tractor. This is a great advantage over the use of a fixed packing house in that the onions can be prepared and bagged ready for shipment to market in the field. Use of the stationary onion combine nevertheless requires the onions to be brought to the location of the combine in the field.

SUMMARY OF THE INVENTION

The present invention provides onion harvesting apparatus which represents a significant improvement over the prior art. There is thus provided in accordance with an embodiment of the invention mobile onion harvesting apparatus comprising a wheeled chassis arranged to be coupled to driving means, a produce receiving hopper, conveyor apparatus for raising produce from the hopper, precleaning apparatus, trimming apparatus and means for operating said conveyor apparatus during movement of the wheeled chassis.

Further in accordance with an embodiment of the present invention sorting means are also provided.

Additionally in accordance with an embodiment of the present invention there is provided bagging apparatus comprising at least one bagging bin receiving produce, bag support apparatus for securing a bag in produce receiving relationship with a bin and bin outlet closing apparatus associated with the bag support apparatus for opening the bin when a bag is associated therewith and closing the bin when a bag is not secured thereto, the bin being sized to be sufficiently big to receive and hold produce reaching it during the normal time required for switching bags.

Further in accordance with an embodiment of the present invention automatic onion pickup means will be associated with the produce receiving hopper so as to enable the harvesting apparatus to pass through a field of dried onions and harvest them.

BRIEF DESCRIPTION OF THE DRAWINGS

The invention will be more fully understood and appreciated from the following detailed description taken in conjunction with the drawings in which.

DETAILED DESCRIPTION OF THE INVENTION

Figure 1:
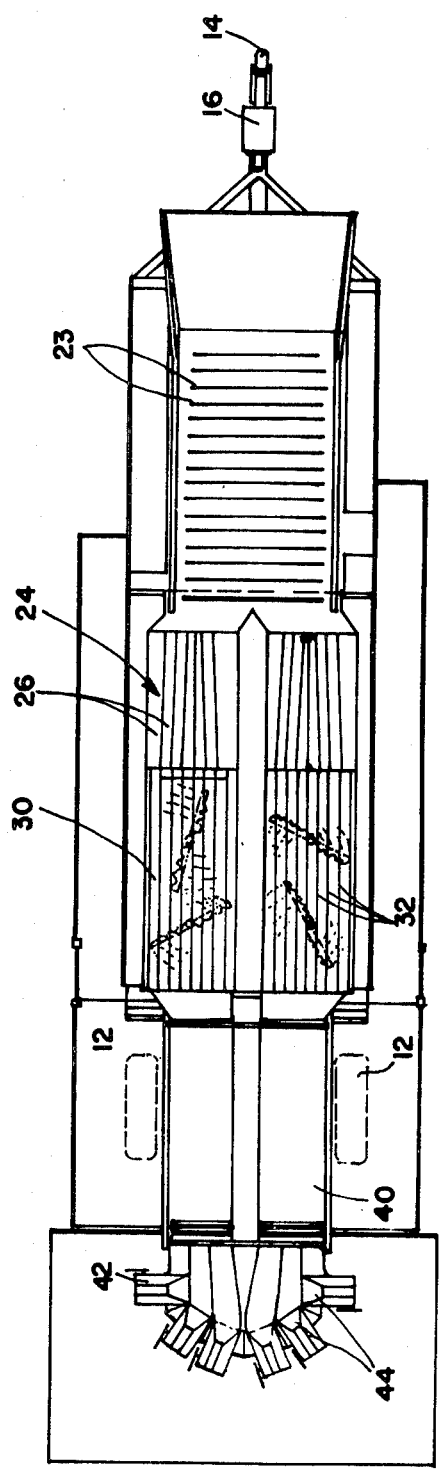
FIG. 1 is a top view of harvesting apparatus constructed and operative in accordance with an embodiment of the present invention.
Figure 2:
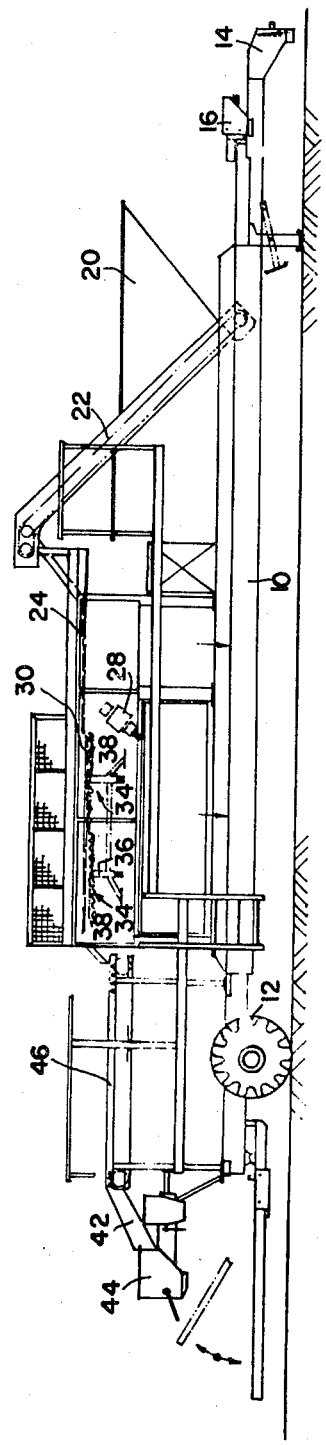
FIG. 2 is a side view, sectional, illustration of harvesting apparatus constructed and operative in accordance with an embodiment of the present invention.

Referring now to FIGS. 1 and 2 there is see apparatus for harvesting and packaging onions constructed and operative in accordance with an embodiment of the present invention. It is a particular feature of the invention that this apparatus is designed for operation while in motion. Thus, in contrast with prior art devices, it can move together with the dried onion pick up machine through the field and does not require additional collecting and loading steps.

The apparatus comprises a chassis 10 which is mounted on wheels 12 and is formed with a tow coupling 14 at its front end. A power coupling 16 is designed to be operated by the power take off of a tractor which pulls the apparatus at the same time. The power coupling 16 operates a hydraulic pump 18 which is connected in turn to the various driven moving parts of the apparatus.

Mounted on chassis 10 is a produce receiving hopper 20 which is arranged to receive produce, particularly onions, from a pick up device moving alongside. A produce conveyor 22, comprising a plurality of spaced slats 23 raises produce from the hopper and drops them onto a precleaner. Conveyor 22 permits debris, such as onion skins and soil to pass therethrough and thus be separated from the produce.

The precleaner is indicated generally by reference numeral 24 and comprises a generally planar array of narrow rods which are spaced such that produce remains thereon while permitting debris of various types to fall therethrough. The array, indicated by reference numeral 26 is coupled to a source of vibratory motion 28 for causing vibration of the tray to enhance the separation of debris from the produce supported thereby.

Due to the inclined orientation of the vibration vector of the precleaner array 26, produce and particularly generally round produce such as onions tends to roll onto a trimming device 30. Trimmer 30 comprises a produce supporting array 32 of narrow spaced bars. Disposed underneath the array 32 and in closely spaced relationship thereto are a plurality of rotatable blade assemblies 34, each comprising a generally vertical drive shaft 36 arranged for rotational motion driven by a motor such as a hydraulic motor and having a pair of blades 38 extending generally radially outward therefrom.

A number of particular features concerting the blade assemblies 34 are of significance: Firstly the blades are not horizontally oriented but instead they are oriented on a slant. This arrangement enhances the suction effect produced by rotation of the blade assemblies and urges the onions strongly against the array 32 for close trimming. Secondly, the cutting edges of the blades are set off from from the center of the drive shaft 36, thus imparting an additional transverse moment to onions engaged thereby which tends to cause the onions to rotate on array 32, permitting trimming thereof on all surfaces. Thirdly, the blades are serrated, which maintains their sharpness longer than other blade designs and also provides various transverse impulses to onions engaged thereby due to the variation in the axis of the cutting surface engaging the onions.

The vibratory motion source 28 may also be coupled to array 32 for enhancing continuing repositioning of the onions thereon for high quality trimming. The vibration of the precleaner and the trimmer also provides driving of the onions through the apparatus.

Array 32 is vibrated with a vibration vector which is inclined upwardly such that trimmed onions passing therealong rolll or slide onto a sorting conveyor 40. Sorting conveyor 40 provides a surface on which workers can manually grade the onions for quality and size and reject unsuitable onions and debris. Sorting conveyor 40 may also comprise manual or automatic size grading apparatus of conventional construction.

Figure 3:
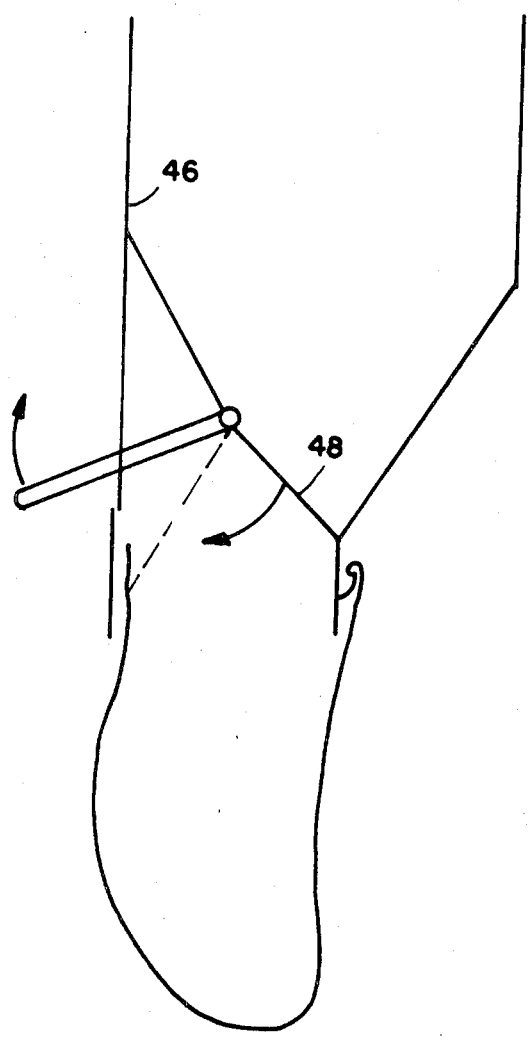
FIG. 3 is a detailed illustration of bagging bin apparatus constructed and operative in accordance with the present invention.

The outlet of sorting conveyor 40 is a plurality of produce supply channels 42 each of which leads to a bagging bin 44. Bagging bins 44 are described in detail by reference to FIG. 3 and comprise a container 46 having a pivotable bottom 48 which is hinged onto the walls of the container and is coupled to a handle. Outside of the container this bottom is also the sack gripping member. According to a preferred embodiment of the present invention, the arrangement is such that when the pivotable bottom is gripping the sack, the bottom of the container is open and when it releases the sack, the bottom of the container is closed, preventing egress of the onions therefrom.

It is appreciated that there is normally a constant flow of onions to the container 46 along channel 42 and thus during bag changes it is necessary to prevent loss of onions due to overflow of the container 46. The container is thus designed to be sufficiently large to accomodate the onions that arrive thereat during the time required to change bags.

Figure 4:
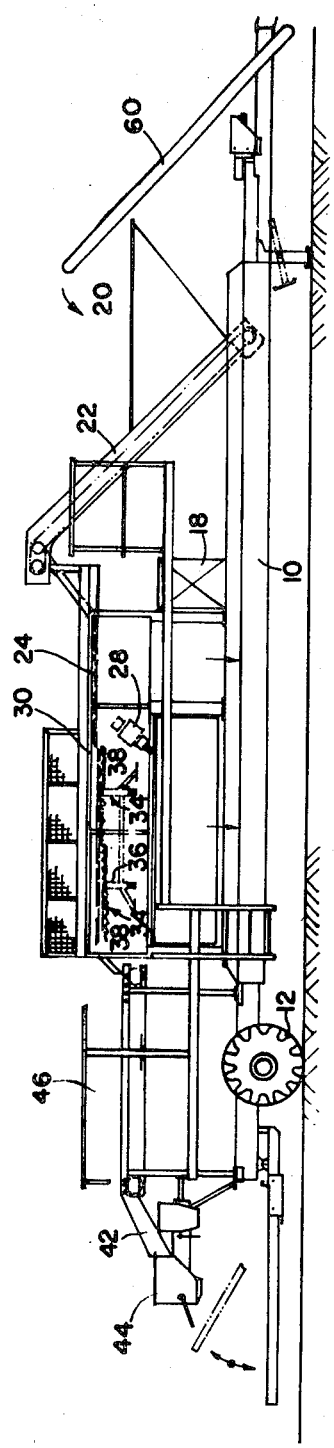
FIG. 4 is a side view sectional illustration of harvesting apparatus constructed and operative in accordance with an alternative embodiment of the present invention.

FIG. 4 shows a modified version of the apparatus of FIG. 2 in which an onion pick up conveyor 60 is provided. Pick up conveyor 60 is arranged to pass through a field of sun dried onions and to raise them from the ground surface. The output of pick up conveyor 60 is supplied to bin 20.

It will be appreciated by persons skilled in the art that the invention is not limited to what has been particularly shown and described hereinabove. Rather the scope of the present invention is defined only by the claims which follow:

I claim:
1. Mobile onion harvesting apparatus comprising: driving means; p1 a wheeled chassis arranged to be coupled to said driving means;
a produce receiving hopper;
conveyor apparatus for raising produce from said hopper;
precleaning apparatus receiving onions from a conveyor apparatus, said precleaning apparatus including a generally planar array of spaced elements defining interstices therebetween and vibratory means coupled to said array for imparting vibration thereto, thereby to enhance the removal of debris through said interstices; and
trimming apparatus for receiving onions from said conveyor apparatus and trimming off the tops and bottoms of the onions, said trimming apparatus comprising an array of spaced elements, a plurality of rotary blade assemblies disposed thereunder and means for applying vibratory motion to said array with a vibration vector which is inclined upwardly with respect to said array such that trimmed onions are continually repositioned and roll or slide therealong.

2. Mobile onion harvesting apparatus according to claim 1 and also comprising size grading means receiving trimmed onions from said trimming apparatus.

3. Mobile onion harvesting apparatus according to claim 1 or claim 2 and also comprising bagging apparatus including at least one bagging bin for receiving trimmed onions, combined bag support and bin closing apparatus for securing a bag in produce receiving relationship with a bagging bin and for opening a bagging bin bottom only when a bag is associated therewith and closing said bagging bin bottom when said bag is not secured thereto, said combined apparatus having a first engaged position wherein a bag is engaged thereby at a bagging bin and the corresponding bin bottom is opened and a second disengaged position wherein no bag engagement is provided and the corresponding bin bottom is closed.

4. Mobile onion harvesting apparatus according to claim 1 and wherein said vibratory means of said precleaner apparatus is operative to provide vibration of said planar array along a vibration vector inclined with respect to said planar array whereby said onions tend to roll onto said trimming apparatus.

5. Mobile onion harvesting apparatus according to claim 1 and wherein said trimming apparatus comprises at least one drive shaft and at least one serrated blade mounted on said drive shaft at a location offset from the center thereof.

6. Mobile onion harvesting apparatus according to claim 1 and wherein said trimming apparatus comprises an inclined onion support surface for causing onions to roll thereon resulting in exposure of various surfaces of the onions for trimming.

7. Mobile onion harvesting apparatus according to claim 1 and also comprising onion pick-up means mounted on said chassis for raising onions from a field surface during motion of said chassis and supplying said onions to said hopper.

* * * * *